US010442030B2

(12) United States Patent
Severson et al.

(10) Patent No.: US 10,442,030 B2
(45) Date of Patent: Oct. 15, 2019

(54) FRICTION STIR WELDING TOOL, RELATED METHODS, AND ASSEMBLIES FORMED TO INCLUDE FRICTION STIR WELD

(71) Applicant: Seagate Technology LLC, Cupertino, CA (US)

(72) Inventors: Samuel Edward Severson, Longmont, CO (US); Jeffrey L. Bruce, Longmont, CO (US); Jerome Thomas Coffey, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/698,949

(22) Filed: Sep. 8, 2017

(65) Prior Publication Data

US 2019/0076957 A1 Mar. 14, 2019

(51) Int. Cl.
*B23K 20/12* (2006.01)
*B23K 101/24* (2006.01)
*B23K 101/36* (2006.01)

(52) U.S. Cl.
CPC ........ *B23K 20/1255* (2013.01); *B23K 20/129* (2013.01); *B23K 20/1225* (2013.01); *B23K 2101/24* (2018.08); *B23K 2101/36* (2018.08)

(58) Field of Classification Search
CPC ........................................... B23K 20/122–128
USPC ................................................ 228/112.1, 2.1
See application file for complete search history.

(56) References Cited

U.S. PATENT DOCUMENTS

| | | | | |
|---|---|---|---|---|
| 5,460,317 A * | 10/1995 | Thomas | ........... | B29C 66/1142 228/112.1 |
| 6,029,879 A * | 2/2000 | Cocks | ........... | B23K 20/1255 228/106 |
| 6,510,975 B2 * | 1/2003 | Enomoto | ........... | B23K 20/1255 228/112.1 |
| 6,669,075 B2 * | 12/2003 | Colligan | ........... | B23K 20/1255 228/112.1 |
| 6,915,939 B2 * | 7/2005 | Hashimoto | ........ | B23K 20/1255 228/2.1 |
| 8,016,179 B2 | 9/2011 | Burford | | |
| 8,279,552 B2 | 10/2012 | Stipe | | |
| 8,579,180 B2 * | 11/2013 | Burford | ........... | B23K 20/1255 228/112.1 |
| 9,536,572 B2 | 1/2017 | Lapp et al. | | |
| 2004/0195291 A1 * | 10/2004 | Andersson | ........ | B23K 20/1255 228/2.1 |
| 2005/0121497 A1 * | 6/2005 | Fuller | ........... | B23K 20/1255 228/112.1 |
| 2006/0043151 A1 * | 3/2006 | Stol | ........... | B23K 20/1255 228/2.1 |
| 2006/0043152 A1 * | 3/2006 | Stol | ........... | B23K 20/1255 228/2.1 |

(Continued)

FOREIGN PATENT DOCUMENTS

JP 2001205454 A * 7/2001 ........ B23K 20/1255
JP 2004130367 A * 4/2004

(Continued)

*Primary Examiner* — Kiley S Stoner
(74) *Attorney, Agent, or Firm* — Kagan Binder, PLLC (57) ABSTRACT

Described are tools useful to produce a friction stir weld, methods of forming a friction stir weld, and assemblies such as electronic devices that include a friction stir weld.

20 Claims, 6 Drawing Sheets

(56) References Cited

U.S. PATENT DOCUMENTS

| | | | |
|---|---|---|---|
| 2006/0054252 A1* | 3/2006 | Sankaran | B23K 20/1205 |
| | | | 148/535 |
| 2006/0289608 A1* | 12/2006 | Steel | B23K 20/1255 |
| | | | 228/101 |
| 2007/0064403 A1 | 3/2007 | Badarinarayan et al. | |
| 2008/0011810 A1* | 1/2008 | Burford | B23K 20/1255 |
| | | | 228/2.1 |
| 2008/0251571 A1* | 10/2008 | Burford | B23K 20/1255 |
| | | | 228/114.5 |
| 2009/0140027 A1* | 6/2009 | Badarinarayan | B23K 20/1255 |
| | | | 228/114.5 |
| 2010/0081005 A1* | 4/2010 | Aoh | B23K 20/1255 |
| | | | 428/615 |
| 2015/0174697 A1* | 6/2015 | Fukuda | B23K 20/1255 |
| | | | 228/2.1 |
| 2015/0360317 A1* | 12/2015 | Kalvala | B23K 20/1265 |
| | | | 228/2.3 |
| 2016/0008918 A1* | 1/2016 | Burford | B23K 20/1255 |
| | | | 228/112.1 |
| 2017/0062019 A1 | 3/2017 | Severson et al. | |
| 2017/0157720 A1* | 6/2017 | Sato | B23K 20/12 |
| 2018/0214975 A1* | 8/2018 | Werz | B23K 20/1255 |

FOREIGN PATENT DOCUMENTS

| | | | | |
|---|---|---|---|---|
| JP | 2004141897 A | * | 5/2004 | |
| JP | 2012125822 A | * | 7/2012 | |
| JP | 5514782 B2 | * | 6/2014 | |
| JP | 2017070994 A | * | 4/2017 | |
| WO | WO-2017017254 A1 | * | 2/2017 | B23K 20/1255 |

* cited by examiner

FRICTION STIR WELDING TOOL, RELATED METHODS, AND ASSEMBLIES FORMED TO INCLUDE FRICTION STIR WELD

FIELD

The invention relates to tools useful to produce a friction stir weld, methods of forming a friction stir weld, and assemblies such as (but not limited to) electronic devices that include a friction stir weld.

BACKGROUND

Friction stir welding is a method useful for joining two or more separate metal pieces by way of a strong, permanent metallic bond (i.e., weld). The method involves rotating a friction stir welding tool at high speed and contacting the tool, with pressure, at a joint formed between edges of the pieces. Mechanical stirring and frictional heat introduced into the material at the joint by the rotating tool, form the weld. A lengthwise joint is produced by moving the rotating tool along the joint.

Friction stir welding can be useful in manufacturing countless metal products that are made of pieces or components that include two adjacent metal pieces that form a joint that requires a weld. As a single non-limiting example, friction stir welding is used for manufacturing electronic devices such as data storage devices (e.g., hard disk drives or HDDs), solid state memories, microelectronic devices, and computers personal computers, cell phones, tablets, laptops, etc.).

To increase reliability of many electronic devices, their electronic components are placed within a metal enclosure that can be closed or sealed to prevent moisture, gases, and particulates from contacting these components. The enclosure may be very tightly sealed, e.g., hermetically sealed, to create a compositionally stable interior atmosphere and to prevent other gas from entering or exiting the interior. Enclosures of some hermetically-sealed electronic devices (e.g., hard disk drives) are filled with a non-air atmosphere, for example a low density atmosphere (e.g., helium), as a way to improve device performance. There are various benefits to operating a hard disk drive in a low density atmosphere. A low density atmosphere (relative to air, e.g., a helium atmosphere) in a hard disk drive HDD can reduce the amount of drag force that affects a spinning disk or a stack of closely-spaced spinning disks. The reduced amount of drag can significantly reduce the amount of power required to cause the disk or disk stack to spin. Also, a low density atmosphere can reduce the amount of un-wanted, non-rotational movement or "flutter" that can occur in a spinning disk and a disk suspension during use. Reducing un-wanted motion of a disk or disk suspension can allow adjacent disks of a disk stack to be placed more closely together, which increases areal density (a measure of the quantity of information bits that can be stored on a given area of disk surface) by enabling a narrower data track pitch. Efficient thermal conduction of helium can also allow for a reduced operating temperature of a device, and lower density gases (relative to air) can produce less acoustic noise. The reliability of a hard disk drive that contains a non-air atmosphere in a hermetically sealed enclosure can also be increased due to reduced humidity, reduced levels of other corrosive gases and contaminants, and due to a reduced sensitivity of the atmosphere to altitude and external pressure variations.

More generally, friction stir welding is useful for many purposes in addition to the manufacture of sealed enclosures of electronic devices. On a commercial scale, for friction stir welding to be a method of choice for welding two metal pieces together, the friction stir welding process must be efficient, cost-effective, reliable, and must produce a high quality weld that is strong and aesthetically suitable, meaning that the weld finish is smooth and preferably burr free. When the weld is produced on a hermetically sealed enclosure, the weld must be highly impermeable to gases. Manufacturers that require methods for welding two metal pieces together are in ongoing pursuit of new and improved welding tools and welding methods.

SUMMARY

Friction stir welding is a technique that is known to be useful in various applications for welding metals. See for example U.S. Pat. Nos. 8,016,179 and 9,536,572, the entireties of these documents being incorporated herein by reference. Friction stir welding techniques, however, are known to have certain operational limits, and are understood to be not necessarily effective or efficient for every situation where a weld between two separate metal pieces is required. Friction stir welding techniques may be useful for welding two metal pieces that each have a certain minimum thickness, for example two metal pieces that are of at least a minimum thickness, with the two thicknesses being close to the same. Friction stir welding may not necessarily be reliably or successfully used to weld together two metal pieces that are both relatively thin, or to weld together a first metal piece having a relatively thin dimension with a second metal piece having a relatively greater thickness.

In addition, even when friction stir weld methods are generally effective, these welds can be prone to the presence of burrs on a finished surface of a weld. The formation of a burr can be especially likely when a friction stir weld is formed by a process that includes a high rotational speed of a tool, and a high translational speed (of the tool along the length of a joint in forming a weld), each of which is typically desired when forming a friction stir weld on a workpiece that includes a relatively thin material. A burr on a weld surface, especially if the burr is sharp, is undesired for reasons that are readily apparent. The term "burr" as used herein is given its common meaning in the welding and metal cutting arts, and refers to a protrusion or thin ridge (which is often sharp) of material that is formed during a welding step and remains at a surface of the welded workpiece at a region of a weld, e.g., at an edge of a weld.

Example friction stir welding tools can include, inter alia, a support body that has a distal face centered on an axis (a rotational axis) of the support body, a shoulder at a perimeter of the distal face, and a pin that extends from the distal face along the axis in a direction distally from the distal face and the shoulder. During a friction stir welding process, the tool is rotated about the axis at a relatively high speed. While being rotated, the distal face of the tool is pressed against a surface of a workpiece (the term "workpiece" referring to one or multiple individual pieces that can form a joint). Commonly, the pin of the tool is placed into contact with a joint or seam formed by placing edges of two pieces together, so that the distal face of the tool contacts a surface of the workpiece. The tool is moved along a length of the workpiece, e.g., along the joint (sometimes referred to as a faying surface) of two separate pieces that combine to form the workpiece.

Friction stir welding can be considered a forging process. The rotating friction stir welding tool provides forging heat and force that allow material at a joint to be softened and combined (mixed) by being stirred together by the pin. Primary functioning features of the friction stir welding tool include the distal face, the shoulder, and the pin (a.k.a. "tip" or "stirring tip"). The shoulder, by being held in contact with a surface of the workpiece with pressure and rotation, is effective to generate frictional heat that is effective to soften the material of the workpiece and initiate the forging process. The pin, extending from the shoulder and into material of the workpiece, rotates during use within the softened material to mix the material to a desired depth of the weld. The material at the joint that is softened, mixed, and stirred by the rotating pin is sometimes referred to as a "mixed weld nugget" or a "stir zone." The rotating tool travels along a length of the joint in a translational direction, while forming the weld. The rotating tool provides both mechanical heating and containment of the workpiece material at the joint interface (at times referred to as "joint material") to keep the material from escaping the stir zone.

As follows, certain new and inventive tools and methods are described, which are useful for forming friction stir welds. The described methods and tools can be useful for forming a friction stir weld in any type of workpiece having any useful end application or purpose. The described methods and tools may be particularly useful to form a friction stir weld on a workpiece that includes a combination of pieces that includes at least one piece that is relatively thin. Alternately or in addition, methods as described can be less prone to causing the formation of burrs on a finished weld, and can be useful for forming a friction stir weld using a relatively higher rotational speed of the tool, a relatively higher translational speed of the tool, or a relatively lower downforce.

A novel and inventive tool for use in a method as described includes a shoulder that is chamfered. As used herein, the term "chamfer" is given its common meaning, which is to refer to an angled, slanted, or beveled edge between two surfaces of a solid object; with reference to a shoulder of a tool as presently described, a chamfered shoulder between a distal face and an outer surface of a support body of a tool is a shoulder that includes a slanted, angled, or beveled surface that extends between the distal face and the outer surface of a support body of the tool; the chamfered shoulder surface, being located at a perimeter of the support body, is arcuate and also includes a directional component that extends parallel to the axis of the tool. A chamfered shoulder is different from certain previously types of shoulder structures of comparable friction stir tools that include a relatively sharp corner at which a surface of a distal face of a tool directly meets a surface of a support body of the tool.

A chamfered shoulder can be effective to improve one or more performance features of a friction stir welding tool, to improve a method of using the tool to form a friction stir weld, or to improve a friction stir weld produced using the tool. An improvement can be assessed based on a comparison made relative to features of previous friction stir welding tools (and their methods of use) that include a non-chamfered shoulder, such as a shoulder made of a sharp corner (e.g., a ninety-degree corner) at a location of a shoulder, i.e., at a perimeter of a distal face of the tool where the distal end face meets an outer surface of a support body.

As one benefit relative to previous tools, Applicant has determined that a chamfered shoulder of a friction stir weld tool is effective to reduce or prevent the formation of a burr at a finished friction stir weld produced using the tool. Likewise, a chamfered sidewall of a groove of a spiral pattern in a distal face is also effective to reduce or prevent the formation of a burr at a finished friction stir weld produced using the tool. When used with friction stir welding operating parameters that may be more prone to producing a burr, such as high rotational speed and high translational speed of a tool, a tool as described, having a chamfered shoulder and optionally also chamfered sidewalls of a groove of a spiral pattern on a distal face, can be less prone to forming a burr at a finished weld.

Alternately or in addition a chamfered shoulder of a friction stir tool can increase the strength and durability of the tool, which can increase a useful lifetime of the tool. A sharp corner or edge at a shoulder of a friction stir weld tool will become worn or potentially deformed or damaged during use of the tool for forming a friction stir weld, especially over an extended period of use to form many welds. In this manner, the presence of sharp corners or edges at a face of a tool effectively limits the useful lifetime of the tool, and a tool that does not contain the same sharp corners will exhibit a relatively greater useful lifetime.

As another potential advantage, a chamfered shoulder can have relatively improved heat transfer properties as compared to a sharp corner at a shoulder. A sharp corner can tend to accumulate heat more quickly and lose heat more slowly during use, and therefore will tend to achieve higher temperatures during use. A chamfered shoulder, lacking a sharp corner or edge, can have better heat dissipation from the tool, and can operate at a lower temperature, which may be effective in turn to further improve the useful lifetime of the tool, or may alternately allow the tool to be used in a friction stir welding process at more demanding operating parameters such any one or a combination of: increased rotational speed of the tool, increased translational speed, or increased downforce.

In one aspect, the invention relates to a tool for forming a friction stir weld. The tool includes a support body that includes an axis, an outer surface centered on the axis, and a distal end having a distal face centered on the axis and extending to a distal face perimeter. The tool also includes a pin extending from the distal face along the axis and a scroll pattern in the distal face. The scroll pattern includes multiple arcuate grooves in the distal face, each groove extending from a groove start location located between the axis and the distal face perimeter, to a groove end segment at the distal face perimeter. The tool additionally includes chamfered shoulder segments at the perimeter, between the groove end segments.

In another aspect, the invention relates to a method of forming a friction stir weld. The method includes: providing a workpiece comprising a joint formed between a first metal piece and a second metal piece; providing a tool as described herein; placing the tool in contact with the joint; and rotating the tool about the axis while the tool contacts the joint to form a friction stir weld between the first metal piece and the second metal piece.

DETAILED DESCRIPTION

A friction stir welding tool of the present description includes a support body that has an axis (e.g., a rotational or longitudinal axis), an outer surface centered on the axis, and a distal face centered on the axis and extending from the axis laterally to a distal face perimeter. A pin extends from the distal face in a direction along the axis and distally from the distal face. The distal face includes a scroll pattern that includes at least two arcuate grooves formed in the distal face, with each groove extending from a groove start location located between the axis and the distal face perimeter, to a groove end segment at the distal face perimeter.

Also located at the distal face perimeter are shoulder segments that extend about the perimeter, alternatingly between the groove end segments, and that connect the surface of the distal face to a distal end of the outer surface of the support body. The chamfered shoulder segments are surfaces that extend lengthwise along a curved path of the perimeter of the distal face. The chamfered shoulder segments include a longitudinal edge at a corner formed between the chamfered shoulder segment and the distal face, and a second longitudinal edge at a second corner formed between the chamfered shoulder segment and the outer surface of the support body. Between the edges is a surface that when viewed in cross section in a plane that includes the axis can be characterized as including a dimension in a direction that is parallel to the axis, i.e., in a proximal-to-distal direction, and when so viewed can be a flat (linear) surface that makes an angle with the axis. The angle formed between a line extending along that surface and the axis can be an angle that is useful to provide a desired chamfer as described, including example angles in a range from 30 to 60 degrees.

Figure 1:
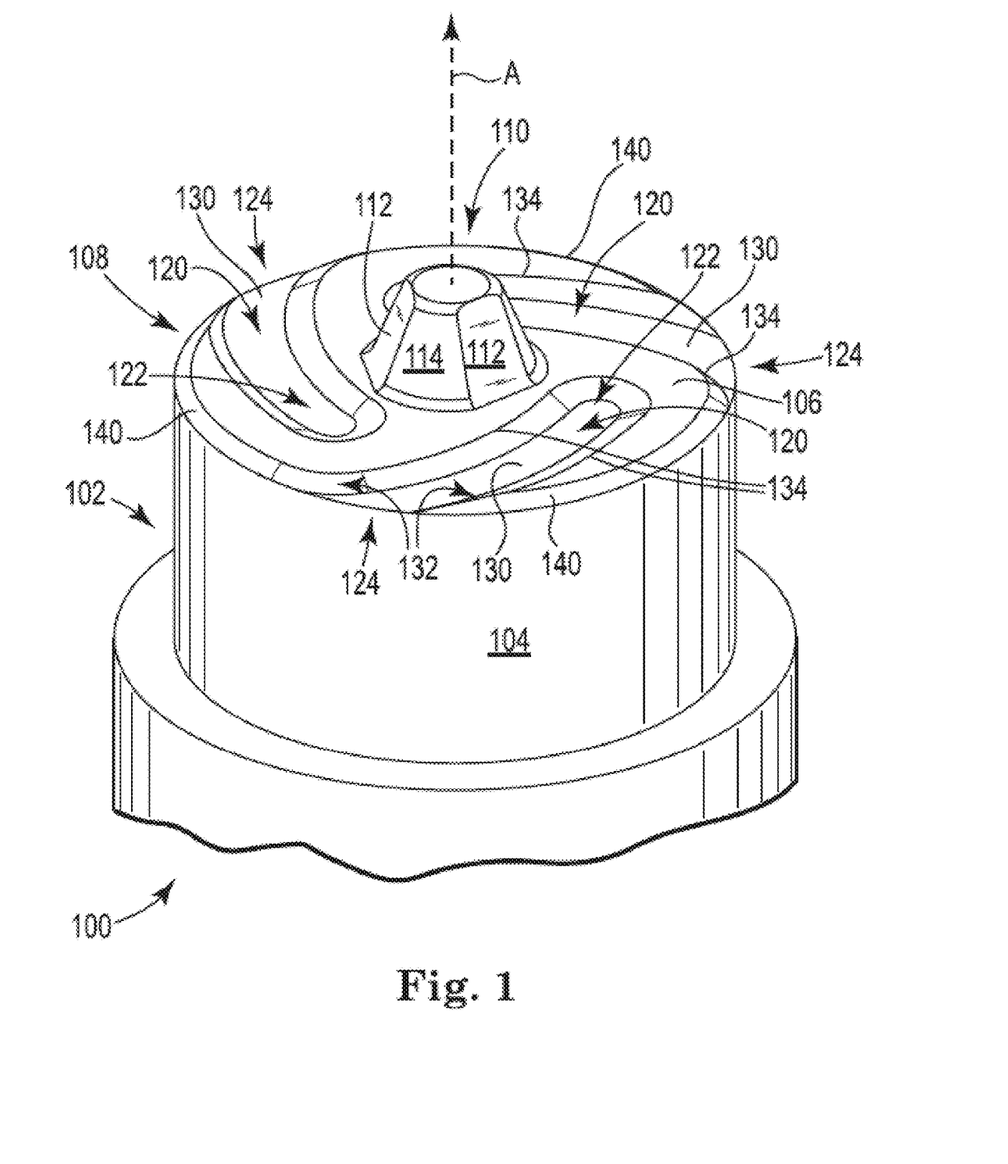
FIG. 1 is a side perspective view of an example tool of the present description.

An example of a tool is shown at FIG. 1. As illustrated, tool 100 includes support body 102 that has a longitudinal axis (A), outer surface 104 centered on the axis, and distal face 106 centered on the axis and extending from the axis laterally to perimeter 108 of distal face 106 and support body 102. Pin 110 extends from distal face 106 in a direction along the axis and distally from distal face 106.

Distal face 106 includes a scroll pattern that includes at least two arcuate (when viewed in a direction of axis A) grooves 120 formed in distal face 106. Each groove 120 extends from a groove start location 122 located between the axis and perimeter 108, to a groove end segment 124 at perimeter 108. A depth of each groove in distal face 106 may be shaped as desired, with useful or preferred grooves having a maximum depth in a range from 0.05 to 0.5 millimeters relative to the surface of distal face 106. Preferred grooves can have a shape (when viewed in cross section in a plane that includes the axis) that includes a bottom 130 (at a maximum depth of the groove) and sidewalls 132 that extend from bottom 130 to opposed distal (e.g., upper) edges 134 of each groove 120, where each groove 120 meets distal face 106 at a cornered edge. The shape of preferred grooves can include sidewalls 132 that are curved or angled relative to the direction of axis A, i.e., not parallel to axis A. For example, sidewalls 132 can be curved, or, preferably chamfered in a manner and at an angle that is similar to or the same as an angle of chamfered shoulder segments 140 of the tool. In cross section, a useful or preferred chamfered sidewall can have a surface that is considered to extend along a line that is non-parallel to the axis, for example along a line that forms an angle with the axis that is in a range from 30 to 60 degrees. Curved or chamfered sidewalls 132 differ from sidewalls that are vertical, meaning sidewalls that extend in a direction that is parallel to axis A.

As illustrated, tool 100 includes three chamfered shoulder segments 140 that extend along perimeter 108 between three groove end segments 124. Each chamfered shoulder segment 140 extends along perimeter 108 between two adjacent groove end segments 124. Each chamfered shoulder segment 140 includes a surface that connects and extends between distal face 106 and a distal end of outer surface 104 of support body 102, with each surface extending in a direction that includes a directional component that is the parallel with the axis. In cross section in a plane of the axis, each chamfered shoulder segment surface can be considered to extend along a line that is non-parallel to the axis, for example along a line that forms an angle with the axis that is in a range from 30 to 60 degrees.

Pin 110 can have any structure, shape, or form that will provide desired performance of tool 100 when used for friction stir welding. Useful and preferred examples of shapes of pin 110 can include multiple outer surfaces (e.g., sidewalls) that include three or more facets 112, which are flat or planar surfaces that can preferably be oriented to be non-parallel to axis A. Facets 112 may be connected to adjacent facets or may optionally be interrupted by rounded portions 114 (as illustrated at FIG. 1). The number of facets on a pin can be as desired and useful, e.g., at least 3, and up to 5, 6, 8, or more. Distal pin end (the portion of pin 110 that is farthest away from distal face 106) of pin 110 can be flat and planar, i.e., perpendicular relative to axis A (see FIG. 1), or (see FIGS. 2A, 2C, and 2D) may be cornered, angular, or substantially sharp, e.g., if formed by an intersection of facts 112.

Specific dimensions of a tool as described can be any that are useful for forming a friction stir weld. Useful sizes of a support body (e.g., diameter at a distal face), grooves, and a pin of a tool can be comparable to tools that have previously been useful for forming friction stir welds. According to certain embodiments of tools of the present description, however, a tool may have relatively smaller features sizes, which may allow a tool to be useful to form friction stir welds with potentially advantageous operating parameters, for example by use of a relatively higher tool rotational speed (rpm), relatively higher translational speed, or a reduced downforce.

In additional detail, useful dimensions of a support body and pin may be ones that are capable of being used to form a desired friction stir weld, with dimensions of any particular tool being selected based on factors that include the type and dimensions (e.g., thickness) of a workpiece, the desired size dimensions (width and depth) of a friction stir weld that is being formed, and desired or preferred operating parameters such as rotational speed (rpm), translational speed, and downforce. For a tool that is capable of preferred uses that include forming a friction stir weld from a relatively thin workpiece, or for use in a friction stir welding process that includes one or more of a relatively high rotational speed (rpm), relatively high translational speed, or relatively low downforce, certain relatively smaller dimensions can be preferred, such as a relatively small diameter of the support body, a relatively short length of a pin, and a relatively small diameter of the pin. According to such embodiments, a diameter of a support body at or near a shoulder may be less than about 10 millimeters, e.g., in a range from 2 to 10 millimeters, such as from 3 to 4 or 3 to 5 millimeters. Also according to these embodiments, a length of the pin may be a length that is sufficient to form a weld of a desired depth; when working with a relatively thin workpiece, a length of an example pin may be in a range from 0.2 to 1.5 millimeters, e.g., from 0.2 to 0.6 or 0.8 millimeters. A diameter of the pin for such embodiments, measured at a base of the pin located at a connection of the pin to the distal face, may be in a range from 0.5 to 1.5 millimeters.

Figure 2A:
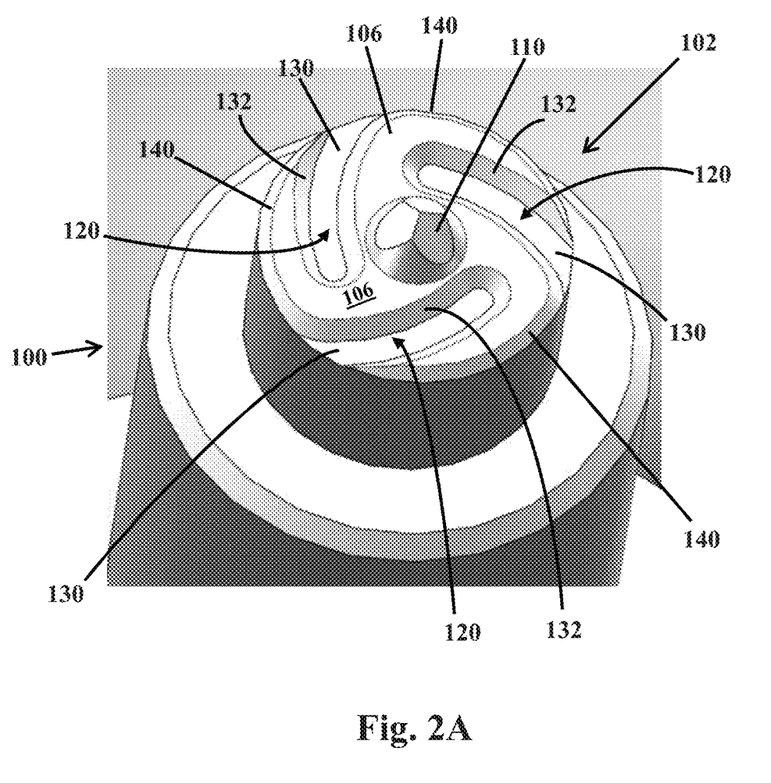
FIGS. 2A, 2B, 2C, and 2D, show examples of alternate tools of the present description.
Figure 2B:
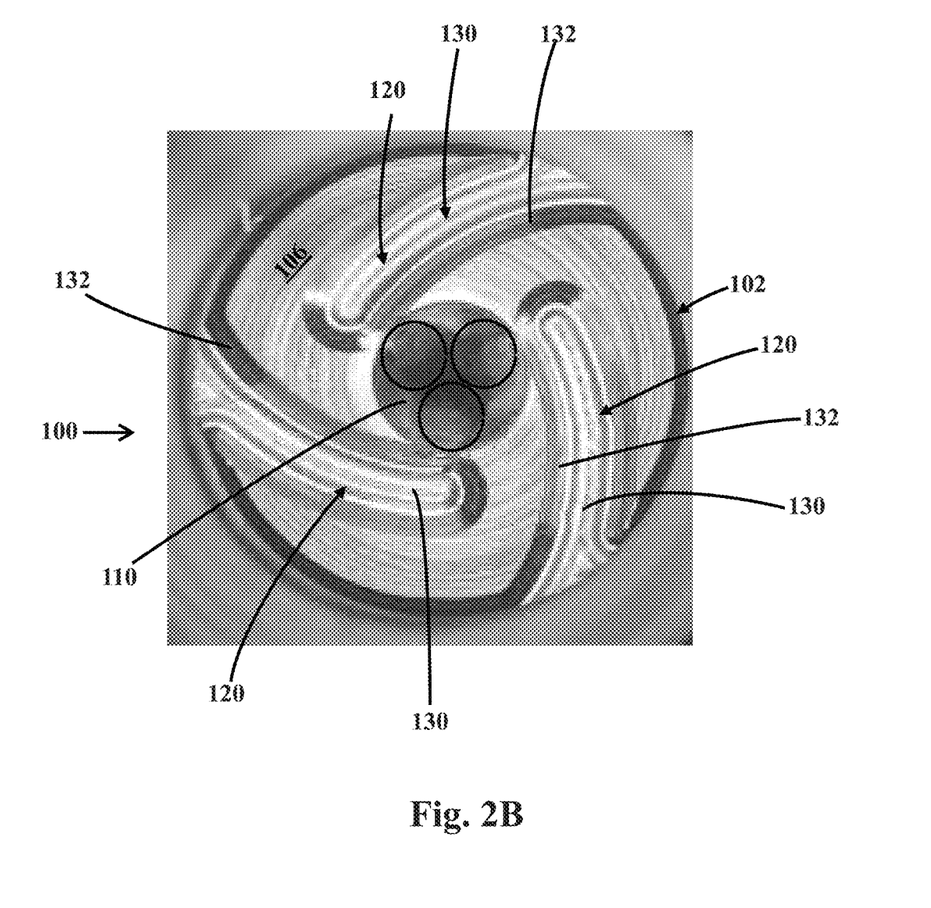
Figure 2C:
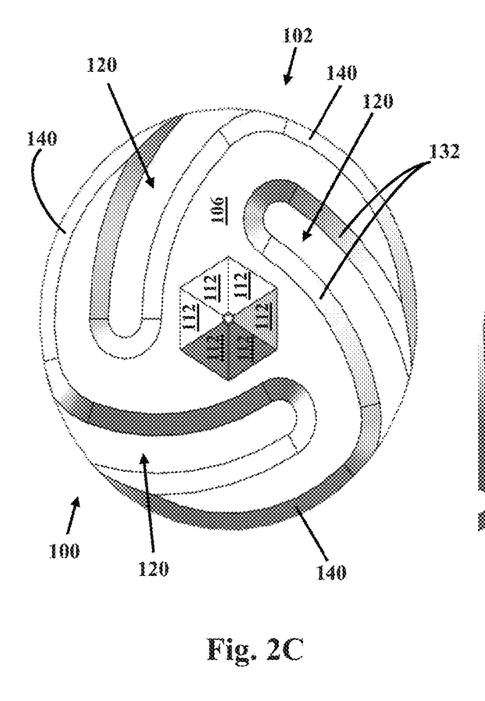
Figure 2D:
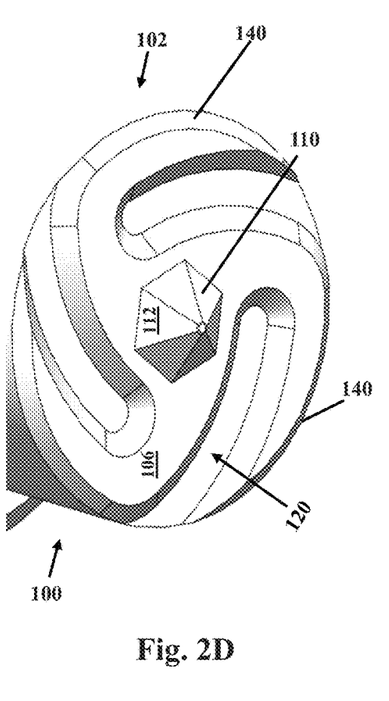

Examples of other designs of a tool as described are shown at FIGS. 2A through 2D. Example tools 100 of FIGS. 2A through 2D are understood to include features of the present description, including features described to be part of tool 100 of FIG. 1, unless otherwise noted or illustrated. For example, each of the tools 100 of FIGS. 2A through 2D includes a support body 102, outer surface 104, distal face 106, pin 110, grooves 120, chamfered shoulder segments 140, and axis A. Example tools 100 of FIGS. 2A (line drawing, perspective view) through 2D also include grooves 120 that are shown to include chamfered sidewalls 132. In addition, the tools of FIGS. 2A through 2D can include variations or additional features as follows. FIGS. 2A (line drawing) and 2B (photograph) show a three-faceted pin 110 (the facets are represented by circles). FIGS. 2C (end view along axis A) and 2D show another embodiment of tool 100, including a six-sided (hexagonal) faceted pin 110.

A tool of the present description can be manufactured by any useful method of forming, shaping, and processing (e.g., hardening) a metal piece intended to be useful for a purpose of cutting, milling, friction stir welding, or machining another piece of metal. Specific examples of useful methods include milling and CNC (computer numerical control) machining of a larger block of metal to form the tool.

Tools as described can be used to form a friction stir weld at a joint formed between two adjacent pieces or components of a workpiece, e.g., two metal pieces. Examples of pieces of a workpiece can be two adjacent metal pieces that include opposed surfaces and edges that fit together to form a joint, for example to provide a close fit between the two pieces at the joint to prevent or minimize the presence of space between the surfaces, which may contain air. The two pieces and the joint can have any structures that can be friction stir welded to produce an effective weld. Non-limiting examples include joints sometimes referred to as butt-joints, lap joints, parallel joints, shoulder joints, corner joints, among others, that include two separate pieces held together to form a dis-connected joint at which a friction stir weld can be formed.

While the methods and tools of the present description can be useful for forming a weld on any two metal pieces, certain particular embodiments of the invention relate to methods for forming a friction stir weld on a workpiece that is an assembly of two metal pieces that fit together to form an enclosure for an electronic device. Such an assembly can include two metal pieces that can be placed adjacent to each other and in contact with each other to form an enclosure, with surfaces of the two metal pieces forming a joint at which a friction stir weld can be produced to bond (weld) the two metal pieces to each other. Example enclosures can be useful as part of an electronic device, for example a hermetically sealed hard disk drive, a solid state memory device, a semiconductor device, or a general computing device such as a personal (desktop) computer, cell phone, tablet, laptop, or the like.

Desirably as a feature of certain types of enclosures or electronic devices, an interior space of an enclosure can be filled with low density gas to provide a low density (relative to air) atmosphere within the enclosure. After filling the interior with the low density gas, the joint can be processed to form a friction stir weld along the entire length of the joint, typically about an entire perimeter of a device, to hermetically seal the enclosure containing the low density gas. Example hermetically sealed enclosures that include a friction stir weld as described can allow for not more than a very low rate of leakage from the enclosure, for example a rate of leakage that is less than 1 percent of a volume of atmosphere (gas) present within the enclosure per year. Examples of hard disk drives that include a base and a cover and that can be hermetically sealed to contain a low density atmosphere are described in U.S. Pat. No. 9,536,572, and also in Applicant's co-pending United States Patent Applications entitled "Assemblies, Devices with Friction Stir Weld, Precursors Thereof, and Related Methods," filed on even date herewith, the entirety of each of these documents being incorporated herein by reference. See also U.S. Pat. No. 8,279,552, describing a hermetically sealed hard disk.

Figure 3A:
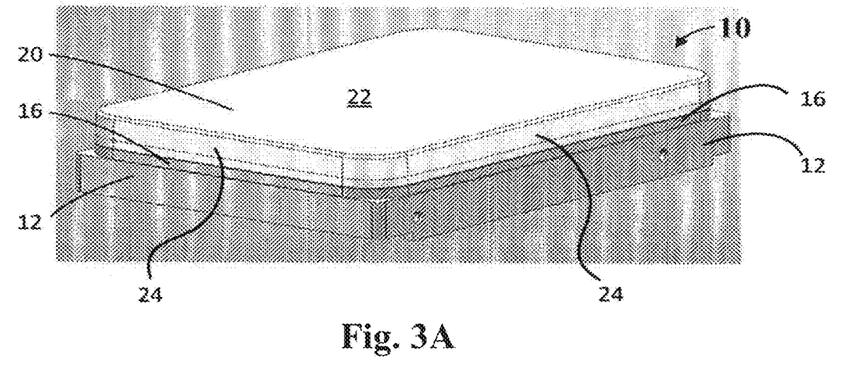
FIGS. 3A and 3B are side perspective and side cross-section (respectively) views of an assembly of the present description.
Figure 3B:
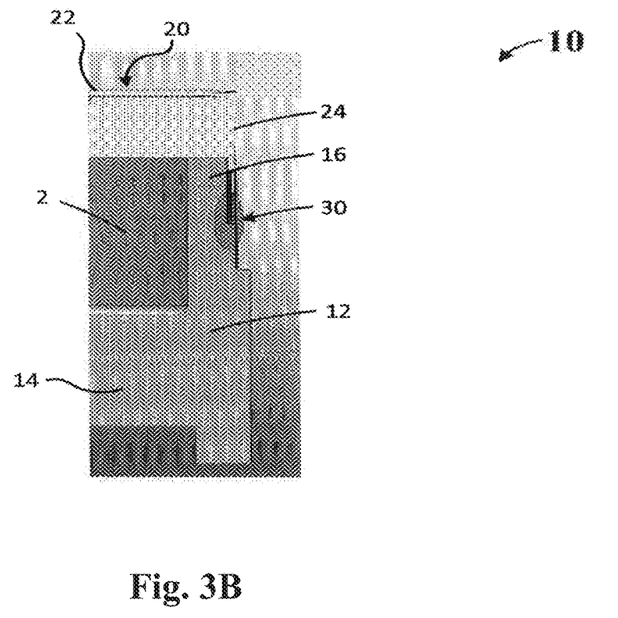

A single example of this type of workpiece is shown at FIGS. 3A and 3B, which specifically show an example of an electronic device, e.g., hard disk drive 10 that includes an enclosure made of base 12, cover 20, and that includes interior (cavity) 2. Base 12 includes a horizontally-extending bottom 14 having a perimeter from which sidewalls 16 extend in an upward vertical direction (i.e., at least substantially or approximately vertical with reference to horizontally-extending bottom 14). Cover 20 includes horizontally-extending top portion 22 having a perimeter from which extends lip 24 in a downward vertical direction (i.e., at least substantially or approximately vertical with reference to horizontally extending top portion 22). A lower end of lip 24 meets sidewall 16 at joint 30, shown before a weld is formed at the joint.

Methods of friction stir welding two pieces of workpiece, e.g., at a joint as described, can be performed by rotating a friction stir welding tool of the present description, and contacting the rotating tool to a workpiece, at the joint. The tool rotating in contact with the workpiece generates heat to soften and allow for flow and mixing of the materials of the workpiece. Specifically, the rotating tool heats and mechanically mixes and joins the heated materials using mechanical pressure to soften the materials, while the rotating pin is effective to mix the softened materials. In preferred embodiments, a depth of the friction stir weld is at least as deep as the thickness of one or both pieces that make up a workpiece, preferably at least 5 or 10 percent greater than a thickness of one or both materials of the workpiece.

Figure 4:
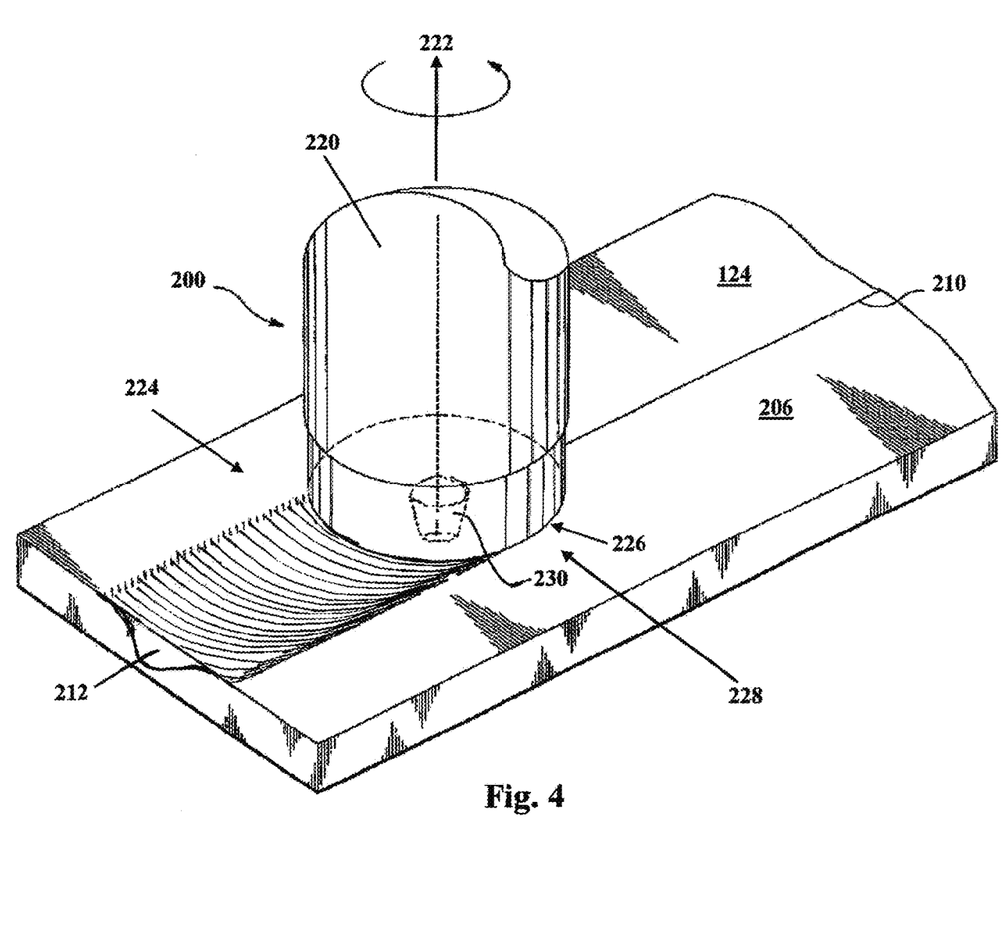
FIG. 4 illustrates an example of a method as described.

Referring to FIG. 4, a method of forming a friction stir weld at a joint as described can be performed by providing a tool 200, as described herein, and rotating the tool while applying pressure at joint 210. A first metal component (piece) 204 and a second metal component (piece) 206 meet and are held together at adjacent edges to form joint 210. Tool 200 includes support body 220 having longitudinal axis 222 and distal end 224. Chamfered shoulder segments 226 at distal end 224 are located at a perimeter of distal face 228 (held, as illustrated, against a top surface of joint 210), and are adapted to contact surfaces of pieces 204 and 206 at joint 210 during friction stir welding. Distal face 228 is centered on axis 222 and extends laterally to a perimeter at chamfered shoulder 226 centered on the axis. Extending in a distal direction from distal face 228, along axis 222, is pin 230, which extends into first and second metal pieces 204 and 206 at joint 210 during friction stir welding. Pressure from tool 200 is applied to joint 210 while tool 200 is rotated to soften and mix materials of metal pieces 204 and 206. As tool 200 moves along joint 210, a stirred zone of 212 is formed beneath the surface of the workpiece.

Parameters of a useful step of forming a friction stir weld can be any that are useful to produce a desired friction stir weld, preferably a friction stir weld that does not include a burr. Examples of parameters that can be selected and controlled include rotation speed of the tool, downforce of the tool against the workpiece, speed of the tool along the length of the workpiece while forming a weld (translational speed), as well as dimensions of the tool itself such as the diameter of the tool at the shoulder (distal face), the diameter and length of the pin (pin length being measured along the axis of the tool, from the distal face), the depth and shape of spiral grooves on the distal face, among other features.

A diameter of a tool can be selected to produce a friction stir weld that has a desired size (width and depth), that is of a desired strength, and that will be useful for efficiently preparing a friction stir weld as described. These features can be selected based on features (e.g., thickness) of the workpiece and parameters of the weld step. Examples of preferred diameters of a tool at the shoulder (e.g., at a distal end of a support body), for use in preferred methods, and corresponding widths of a friction stir weld formed using the tool, may be less than about 10 millimeters, e.g., in a range from 2 to 10 millimeters, such as from 3 to 4 or 3 to 5 millimeters.

A desired depth of a friction stir weld can preferably be at least as deep as, and preferably deeper than, the thickness of one or both of the pieces of a workpiece onto which the weld is being formed. A depth of a friction stir weld will typically be slightly greater than a length of a pin extending from the distal face of a tool used to form the weld. To form a weld of a desired depth, the length of the pin should be at least as long as the thickness of one or both pieces of a workpiece, such as at least 5, 10, 20, or 30 percent greater than the thickness of one workpiece (a thinner workpiece of two), or both workpieces. According to certain embodiments of tools and friction stir weld methods, a length of a pin can be in a range from 0.2 to 1.5 millimeters. A diameter of the pin, measured at a base of the pin located at a connection of the pin to the distal face, can be any useful diameter, such as a diameter in a range from 0.5 to 1.5 millimeters, measured at a base of the pin located at a connection of the pin with the distal face.

During formation of a weld, the tool can be rotated at a speed that is useful to add sufficient energy to a workpiece to soften the material of the workpiece and allow mixing of the material by the rotating pin. Useful and preferred rotational speeds of a tool to form a useful or preferred friction stir weld as described can be at least 1,000 revolutions per minute (rpm), e.g., at least 2,000 rpm, or at least 6,000, 8,000, or 12,000 rpm, and up to about 30,000 rpm.

During formation of the weld, the tool, i.e., at the distal face, can be used to apply a downforce onto the workpiece in a direction along the axis of the tool and toward the workpiece. Any amount of downforce can be used that will be effective in forming a desired weld in an efficient manner. Examples of a preferred amount of downforce may be less than about 1,000 newtons, e.g., less than 500 newtons.

During formation of the weld a tool may be moved along a workpiece, e.g., at a joint, in a lengthwise direction, at any useful speed, preferably a speed that will efficiently form a burr-free weld. Examples of useful speeds (translational speeds) of a tool along a joint during formation of a friction stir weld can be in a range from about 0.1 to 3 meters per minute (1.6 to 50 millimeters per second).

The invention claimed is:

1. A tool for forming a friction stir weld, the tool comprising:
   a support body having:
      a longitudinal axis,
      an outer surface centered on the axis, and
      a distal end having a distal face centered on the axis and extending to a distal face perimeter,
   a pin extending from the distal face along the axis,
   a scroll pattern in the distal face, the scroll pattern comprising multiple arcuate grooves in the distal face, each groove extending from a groove start location located between the axis and the distal face perimeter, to a groove end segment at the distal face perimeter, and
   chamfered shoulder segments at the distal face perimeter between the groove end segments.

2. A tool of claim 1 wherein the chamfered shoulder segments comprise surfaces that extend between the outer surface and the distal face.

3. A tool of claim 2 wherein the chamfered shoulder surfaces extend along the perimeter between a support body edge defined by the chamfered shoulder surface and the outer surface, and a face edge defined by the chamfered shoulder surface and the distal face.

4. A tool of claim 3 wherein an angle at an intersection of the axis and a line that connects the support body edge and the face edge is in a range from 30 to 60 degrees.

5. A tool of claim 3 wherein a chamfered shoulder surface viewed in a cross sectional plane that includes the axis is a line between the support body edge and the face edge.

6. A tool of claim 1 wherein the scroll pattern includes a plurality of spiral grooves, and each groove extends along the distal face, away from the axis, to the perimeter.

7. A tool of claim 1 wherein the grooves have a depth relative to the distal face in a range from 0.05 to 0.5 millimeters.

8. A tool of claim 1 wherein the pin comprises:
   a base at a connection between the pin and the distal face and centered on the axis,
   a distal pin end located away from the base along the axis and centered on the axis, and
   pin sidewalls extending between the base and the distal pin end.

9. A tool of claim 8 wherein the pin sidewalls include from 3 to 8 facets.

10. A tool of claim 1 wherein the support body has a diameter in a range from 2 to 10 millimeters.

11. A tool of claim 1 wherein the pin has a diameter in a range from 0.01 to 1.5 millimeter measured at a connection between the pin and the distal face.

12. A tool of claim 1 wherein the pin has a length along the axis in a range from 0.1 to 1.5 millimeters.

13. A tool of claim 1 wherein the grooves include chamfered sidewalls.

14. A method of forming a friction stir weld, the method comprising:
   providing a workpiece comprising a first metal piece and a second metal piece,
   providing a tool as provided at claim 1,
   placing the tool in contact with the workpiece, and
   rotating the tool about the axis while the tool contacts the workpiece to form a friction stir weld between the first metal piece and the second metal piece.

15. A method of claim 14 wherein, with the tool in contact with the workpiece, the first metal piece has a first thickness in a direction of the axis and the second metal piece has a second thickness in the direction of the axis, and the first thickness is less than the second thickness.

16. A method of claim 15 wherein the first thickness is less than 0.5 millimeters and the second thickness is greater than 0.5 millimeters.

17. A method of claim 14 wherein during rotating the pin extends to a depth of the workpiece that is greater than the first thickness.

18. A method of claim 14 comprising, during rotating, applying downforce in a direction of the axis from the tool to the joint, the downforce being less than 1,000 newtons.

19. A method of claim 14 comprising, during rotating, moving the tool along the joint at a speed that is in a range from 0.1 to 3 meters per minute.

20. A method of claim 14 comprising forming the friction stir weld at a perimeter of the workpiece, wherein the friction stir weld provides a hermetic seal at the perimeter.

\* \* \* \* \*